(12) United States Patent
Shin et al.

(10) Patent No.: US 11,928,813 B2
(45) Date of Patent: Mar. 12, 2024

(54) METHOD AND SYSTEM FOR DETECTING CHANGE TO STRUCTURE BY USING DRONE

(71) Applicant: SMARTINSIDE AI Inc., Suwon-si (KR)

(72) Inventors: Joo Ho Shin, Anyang-si (KR); Seung Hee Park, Seongnam-si (KR)

(73) Assignee: SMARTINSIDE AI INC., Suwon-si (KR)

( * ) Notice: Subject to any disclaimer, the term of this patent is extended or adjusted under 35 U.S.C. 154(b) by 0 days.

(21) Appl. No.: 17/993,908

(22) Filed: Nov. 24, 2022

(65) Prior Publication Data

US 2023/0222647 A1    Jul. 13, 2023

Related U.S. Application Data

(63) Continuation of application No. 17/687,579, filed on Mar. 4, 2022, now abandoned.

(51) Int. Cl.
| | |
|---|---|
| *G06T 7/00* | (2017.01) |
| *B64C 39/02* | (2023.01) |
| *B64U 101/30* | (2023.01) |
| *G06T 7/73* | (2017.01) |
| *G06V 10/74* | (2022.01) |

(Continued)

(52) U.S. Cl.
CPC ............ *G06T 7/001* (2013.01); *B64C 39/024* (2013.01); *G06T 7/73* (2017.01); *G06V 10/761* (2022.01); *G06V 20/17* (2022.01); *G06V 20/176* (2022.01); *B64U 2101/30* (2023.01); *B64U 2201/10* (2023.01); *G06T 2207/10032* (2013.01); *G06T 2207/20081* (2013.01); *G06T 2207/30184* (2013.01)

(58) Field of Classification Search
CPC ...... G06V 10/82; G06V 10/761; G06V 20/17; G06V 20/176; G06T 7/73; G06T 7/001; G06T 7/0002; G06T 2207/20224; G06T 2207/20081; G06T 2207/10016; G06T 2207/10032; G06T 2207/30184; B64C 39/024; B64U 2201/10; B64U 2101/30
See application file for complete search history.

(56) References Cited

U.S. PATENT DOCUMENTS

2022/0019190 A1*   1/2022   Mohamed Shibly ....................... G01N 29/4472

OTHER PUBLICATIONS

Nguyen, Truong Linh, and DongYeob Han. "Detection of road surface changes from multi-temporal unmanned aerial vehicle images using a convolutional siamese network." Sustainability 12.6 (2020): 2482. (Year: 2020).*

(Continued)

*Primary Examiner* — Vu Le
*Assistant Examiner* — Tracy Mangialaschi
(74) *Attorney, Agent, or Firm* — Han's Law Office (57) ABSTRACT

Disclosed herein is a method for an image analysis server to detect a change to a structure by using a drone. The method for an image analysis server to detect a change to a structure by using a drone includes: receiving images of a specific inspection target structure taken at different time points by a drone; detecting the difference between an image taken at a first time point and an image taken at a second time point based on the received images; and detecting a change to the inspection target structure via the detected difference, and generating a risk signal and then transmitting it to an administrator terminal.

4 Claims, 5 Drawing Sheets

(51) Int. Cl.
 *G06V 20/10* (2022.01)
 *G06V 20/17* (2022.01)

(56) References Cited

OTHER PUBLICATIONS

Karaaslan, Enes. "Enhanced Concrete Bridge Assessment Using Artificial Intelligence and Mixed Reality." (2019). (Year: 2019).*

* cited by examiner

METHOD AND SYSTEM FOR DETECTING CHANGE TO STRUCTURE BY USING DRONE

CROSS-REFERENCE TO RELATED APPLICATION

This application is a continuation of U.S. application Ser. No. 17/687,579 field Mar. 4, 2022, which claims under 35 U.S.C. § 119(a) the priority benefit of Korean Patent Application No. 10-2021-0045135 filed on Apr. 7, 2021, the disclosures of all application of which are hereby incorporated by reference.

BACKGROUND

1. Technical Field

The present invention relates generally to a method and system for detecting a change to a structure by using a drone, and more particularly to a method and system for detecting a change to a structure by analyzing images, taken via a drone at different time points, based on a machine learning algorithm.

2. Description of the Related Art

Concrete bridges, high-rise buildings, dams, etc. are easily influenced by external environments after design and completion. Various types of damage resulting from unknown causes may occur under the influence of such external environments.

Currently, administrators regularly inspect individual structures, or detect damage to structures by using well-known non-destructive inspection methods.

For example, an inspector photographs portions deemed necessary for inspection and also inspects them with the naked eye while boarding a boarding device installed at a high location.

However, according to this method, problems arise in that there is the risk of a safety-related accident and the range in which photographing can be performed is limited.

Furthermore, changes to structures are made so fine that it is difficult to identify them with the naked eye. There are cases where a change to a structure cannot be easily identified even when an inspector takes images while taking the risk of a safety-related accident.

Therefore, there is a demand for technology capable of accurately detecting a change to a structure attributable to an external environment and detecting a change to a structure in a convenient way without the risk of a safety-related accident.

SUMMARY

An object of the present invention is to overcome the problems of the conventional technologies described above.

An object of the present invention is to accurately detect a change, such as damage, to an inspection target structure in a convenient way using a drone.

Another object of the present invention is to, via a machine learning algorithm, acquire feature values from images taken at different time points and detect a change to a structure through the comparative analysis thereof, thereby enabling accurate analysis related to damage to the structure.

The objects of the present invention are not limited to the objects described above, and other objects not described above will be clearly understood from the following description.

According to an aspect of the present invention, there is provided a method for an image analysis server to detect a change to a structure by using a drone, the method including: receiving images of a specific inspection target structure taken at different time points by a drone; detecting the difference between an image taken at a first time point and an image taken at a second time point based on the received images; and detecting a change to the inspection target structure via the detected difference, and generating a risk signal and then transmitting it to an administrator terminal.

Detecting the difference may include: acquiring feature maps for respective images by learning an image taken first for the specific inspection target structure and images taken at different time points thereafter by using a machine learning algorithm; and acquiring the difference between the feature map acquired based on the image taken first and the feature map acquired based on each of the images taken subsequently by using a Euclidean distance analysis method.

The method may further include predicting the change pattern of the specific inspection target structure in the future based on a plurality of images of the specific inspection target structure taken at different time points.

Generating the risk signal and then transmitting it may include generating a risk signal when the area of a detected change area or the area value of a change per unit time is equal to or larger than a preset value.

According to another aspect of the present invention, there is provided a system for detecting a change to a structure by using a drone, the system including: an image acquisition unit configured to receive images of a specific inspection target structure taken at different time points by a drone; an image learning unit configured to detect the difference between an image taken at a first time point and an image taken at a second time point based on the received images; and a change detection unit configured to detect a change to the inspection target structure via the detected difference, and generating a risk signal and then transmitting it to an administrator terminal.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

For the following detailed description of the present invention, reference is made to the accompanying drawings that show by way of illustration specific embodiments via which the present invention may be practiced. These embodiments will be described in sufficient detail to enable those skilled in the art to practice the present invention. It should be understood that various embodiments of the present invention are different but are not necessarily mutually exclusive. For example, a specific shape, structure, and/or feature described herein may be implemented as another embodiment without departing from the spirit and scope of the invention with respect to one embodiment. In addition, it should be understood that the locations or arrangement of individual components within each disclosed embodiment may be changed without departing from the spirit and scope of the present invention. Accordingly, the following detailed description is not intended to be taken in a limiting sense, and the scope of the present invention, together with all ranges equivalent to the appended claims if appropriately described, is limited only by the appended claims. Like reference numerals in the drawings refer to the same or similar functions throughout various aspects.

The embodiments of the present invention will be described in detail below with reference to the accompanying drawings so that those of ordinary skill in the art to which the present invention pertains can easily practice the present invention.

Figure 1:
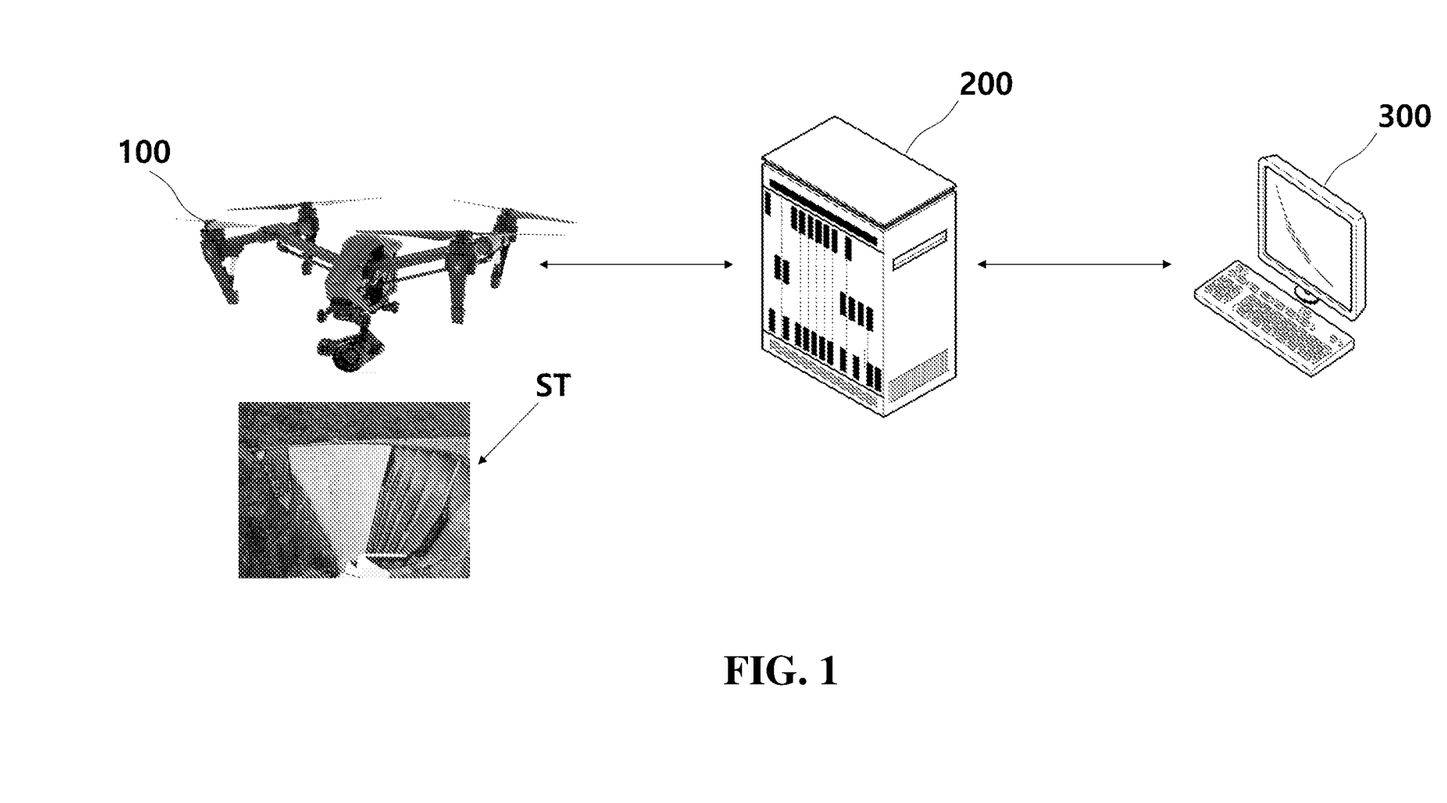
FIG. 1 is a view schematically showing the configuration of a system for detecting a change to a structure by using a drone according to an embodiment of the present invention.

FIG. 1 is a view schematically showing the configuration of a system for detecting a change to a structure by using a drone according to an embodiment of the present invention.

Referring to FIG. 1, the system for detecting a change to a structure by using a drone according to the present embodiment may include a drone 100, an image analysis server 200, and an administrator terminal 300.

The drone 100, the image analysis server 200, and the administrator terminal 300 may communicate over an intercommunication network, e.g., a LoRa communication network, a mobile communication network, a local area network (LAN), a metropolitan area network (MAN), a wide area network (WAN), the World Wide Web (WWW), and/or a wireless fidelity (Wi-Fi) communication network.

The drone 100 may include a flight control module, a Global Positioning System (GPS) module, a photographing module, a level maintenance module, a driving module, a wireless communication module, and a battery module. The drone 100 receives a command input via a controller operated by a driver through wireless communication, and then flies.

The flight operation control and photographing operation control of the drone 100 may be performed by the controller.

For example, the drone 100 is flown and moved to a location desired by the driver according to a command input via the controller operated by the driver, and performs the operation of photographing an inspection target structure ST.

According to another embodiment, the drone 100 may fly in an autonomous flight mode and move to a location close to the inspection target structure ST. For example, the drone 100 may receive data (e.g., information about the location of a destination, or the like) input via a controller or the like over a wireless communication network, and may then generate a path for autonomous flight. Furthermore, the drone 100 may set up a flight plan adapted to fly along the generated path, and may generate a signal adapted to control movement in accordance with the flight plan. The generated signal is provided to the driving module and used to fly the drone.

The drone 100 may further include a proximity sensor, and may further include a collision avoidance alarm system. Furthermore, the drone 100 may further include a system for returning the drone 100 to an appropriate flight path when the drone 100 deviates from the generated flight path.

The drone 100 may perform the operation of switching from the autonomous flight mode to the manual flight mode or the operation of switching from the manual flight mode to the autonomous flight mode. For example, the drone 100 may switch the flight mode thereof from the autonomous flight mode to the manual flight mode or from the manual flight mode to the autonomous flight mode based on a signal received from an interface device provided in the controller operated by the driver.

The photographing operation is performed by the photographing module mounted in the drone 100, and a taken image or video is transmitted to the image analysis server 200.

The image analysis server 200 receives an image or video taken and acquired by the drone 100 and analyzes it. The image analysis server 200 according to an embodiment detects a change to a specific inspection target structure ST via a machine learning algorithm based on images of the corresponding inspection target structure ST taken at different time points. Furthermore, when it is determined that the detected change is in a risky state, this information is transmitted to the administrator terminal 300.

The administrator terminal 300 serves to transmit a command adapted to control the analysis operation of the image analysis server 200, and to receive the results of image analysis acquired by the image analysis server 200. The administrator terminal 300 has a computation function, and may be implemented in any form as long as it is a device capable of communicating with the outside. For example, the administrator terminal 300 may be implemented as a smartphone, a tablet personal computer (PC), a desktop, a laptop, a notebook, a personal digital assistant (PDA), or the like, but is not limited thereto.

Figure 2:
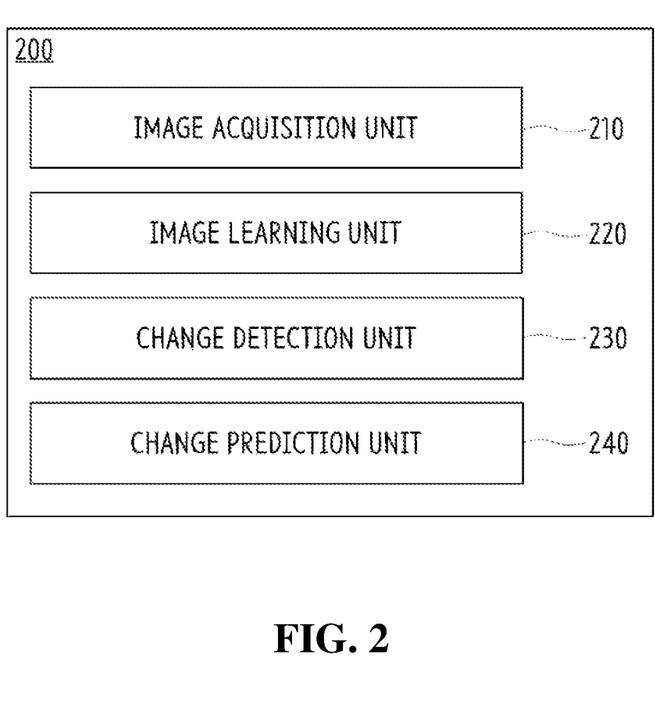
FIG. 2 is a block diagram illustrating in detail the operation and configuration of an image analysis server according to an embodiment of the present invention.

FIG. 2 is a block diagram illustrating in detail the operation and configuration of an image analysis server according to an embodiment of the present invention.

Referring to FIG. 2, the image analysis server 200 may include an image acquisition unit 210, an image learning unit 220, a change detection unit 230, and a change prediction unit 240.

The image acquisition unit 210, the image learning unit 220, the change detection unit 230, and the change prediction unit 240 may be program modules or hardware capable of communicating with external devices. The program modules or hardware may be included in the image analysis server 200 in the form of an operating system, application program modules, or other program modules, and may physically be stored in various types of known storage devices. Meanwhile, these program modules or hardware include, but are not limited to, routines, subroutines, programs, objects, components, and/or data structures that perform specific tasks to be described later or execute specific abstract data types according to the present invention.

The image acquisition unit 210 serves to receive a still or moving image taken by the drone 100. An image taken immediately after the completion of an inspection target structure or an image taken first becomes a reference image of the inspection target structure. Furthermore, one or more images taken at different time points by the drone 100 are also acquired. In order to identify images of the same inspection target structure taken a plurality of times, when an image is received from the drone 100, information about a photographing location, a photographing date, photographing time, and/or the like may also be received as metadata.

The image learning unit 220 performs learning via a machine learning algorithm based on images acquired by the image acquisition unit 210.

Figure 3:
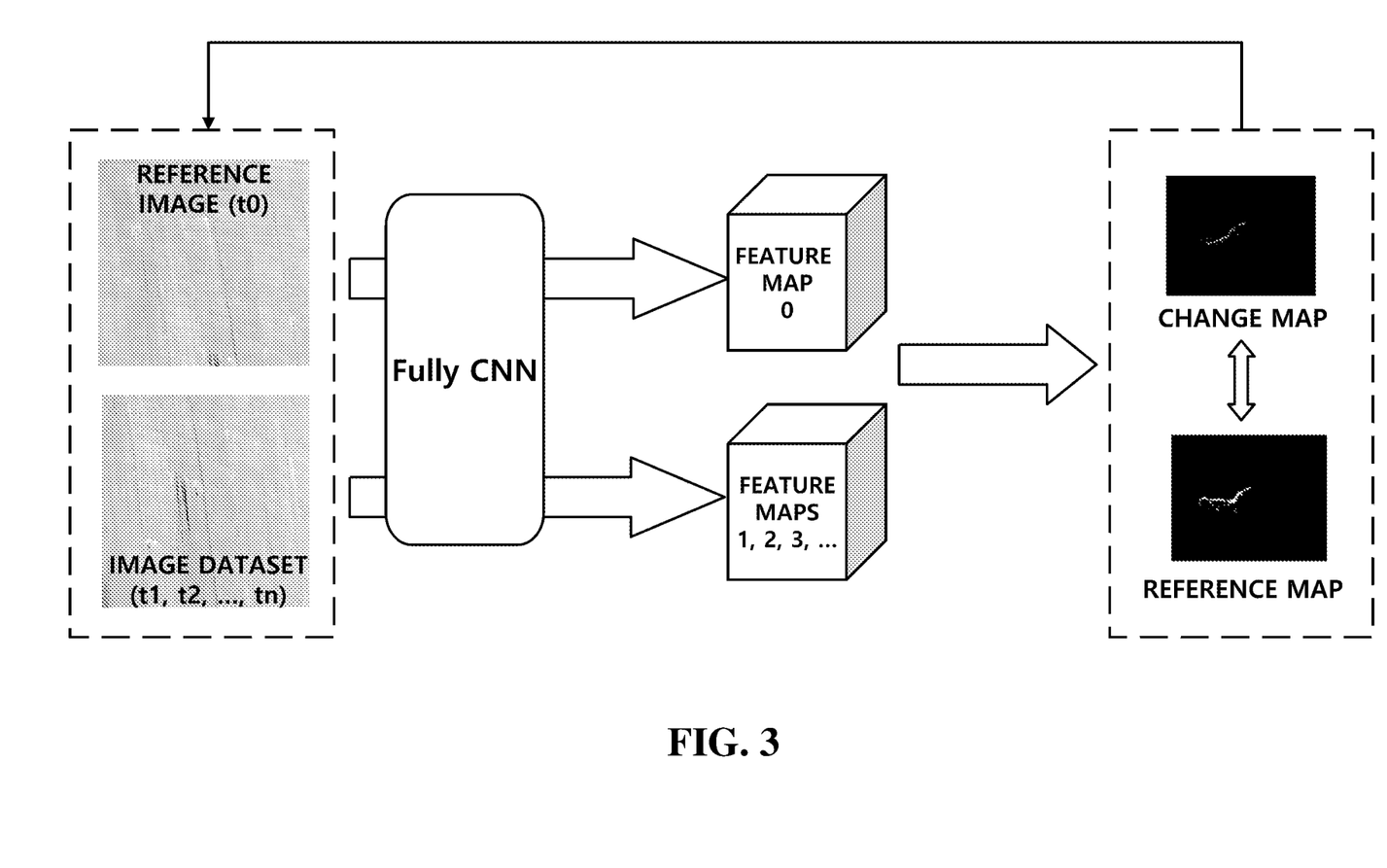
FIG. 3 is a diagram showing an example of a machine learning algorithm used for image analysis according to an embodiment.

FIG. 3 is a diagram showing an example of a machine learning algorithm used for image analysis according to an embodiment.

Referring to FIG. 3, machine learning is performed via a reference image of a specific inspection target structure first acquired at time t0 and a dataset of images acquired at times t1, t2, . . . , tn.

The present invention adopts a learning method using a deep learning technique, which is a type of machine learning. Machine learning is a branch of artificial intelligence, and has evolved from studies of pattern recognition and computer learning theories.

Machine learning improves a knowledge base by using surrounding environments as training elements. A specific task is performed using the improved knowledge base, and the information obtained during the performance of the task is reflected in the training elements again. Machine learning is a technique that studies and constructs a system and algorithm for performing learning based on empirical data in the above manner, making predictions, and improving its own performance. Machine learning algorithms use a method of constructing a specific model to make a prediction or decision based on input data Machine learning may be classified into a method of rote learning and direct provision of new knowledge, a supervised learning method, a learning-by-analogy method, and an inductive learning method according to their learning strategies. The present invention may use at least one of the above learning methods.

The reason why the performance of the deep learning model was improved is that it was possible to train a large-scale model with large-scale data. A major contribution to this was made by a convolutional neural network that is adopted by the present invention.

A convolutional neural network uses convolution kernels to automatically extract useful features and representations from high-dimensional data such as images. Through this, the same parameter value is obtained even when locations are different, and the number of dimensions to be learned may be reduced by reducing the number of parameters. Excessive learning may be prevented and useful features may also be extracted by using a convolutional neural network model.

A convolutional neural network is basically designed to solve supervised learning problems, and is focused on discriminative learning to classify input data. This may improve the performance of pattern classification, and may construct complex features and representations by itself using a considerably large number of neuron layers. A convolutional neural network is a neural network that improves performance by adding a convolution layer and a sub-sampling layer to the fully connected layer of the hidden layer of a conventional neural network and also performing structural subdivision. Deep learning using such a convolutional neural network exhibits considerably excellent accuracy compared to other techniques.

A convolutional neural network performs feature extraction via convolution and performs classification via a neural network. In image processing, convolution refers to image processing performed using a mask having weights. Convolution is a process of putting a mask on an input image, multiplying the pixel values of the input image by the weights of the mask, and then determining the sums to be the pixel values of the output image. A mask used for image processing is referred to as a filter, a window, or a kernel.

The convolution values are calculated while moving the mask after putting the mask on the input image. The purpose of this is to extract features from an image. When features are extracted, robust features that adapt well to environments such as image distortion or deformation are obtained by performing extraction on multiple images.

When convolution and sub sampling are repeated, extracted features remain. When results are input to each input terminal of a neural network, learning is performed.

A convolutional neural network used in deep learning is an artificial neural network that understands images and performs various types of image processing, such as the extraction of high-level abstracted information, e.g., feature values, or the generation of images having new textures, on the images, and is being studied in the field of computer vision.

In an embodiment of the present invention, a feature map for a reference image and a feature map for each of a plurality of images taken at different time points may be acquired by learning a plurality of images through such a convolutional neural network.

Referring back to FIG. 2, the change detection unit 230 analyzes the differences between the feature map acquired through the reference image and the feature maps acquired through the images taken at different times based on the feature maps acquired by the image learning unit 220.

For this analysis, a Euclidean distance analysis method may be utilized. The differences between the acquired reference and other feature maps may be determined on a pixel basis via the Euclidean distance analysis method. A change to an inspection target structure between time t0 at which the first image was taken and the later time point may be determined by detecting the intra-image range in which a difference value is equal to or larger than a threshold value.

As results of the analysis, a "reference image map" acquired through the reference image and a "change image map" acquired through an image taken thereafter may be acquired.

The feature values included in the change image map may function as a mask in subsequent image analysis. A mask for detecting a change to an inspection target structure may be periodically updated by repeating learning and change detection through images taken at different time points.

The time point at which the structure was changed from the first time to the second time may be clearly identified by using a mask, acquired by learning the image acquired at the first time, to analyze the image acquired at the second time.

Figure 4:
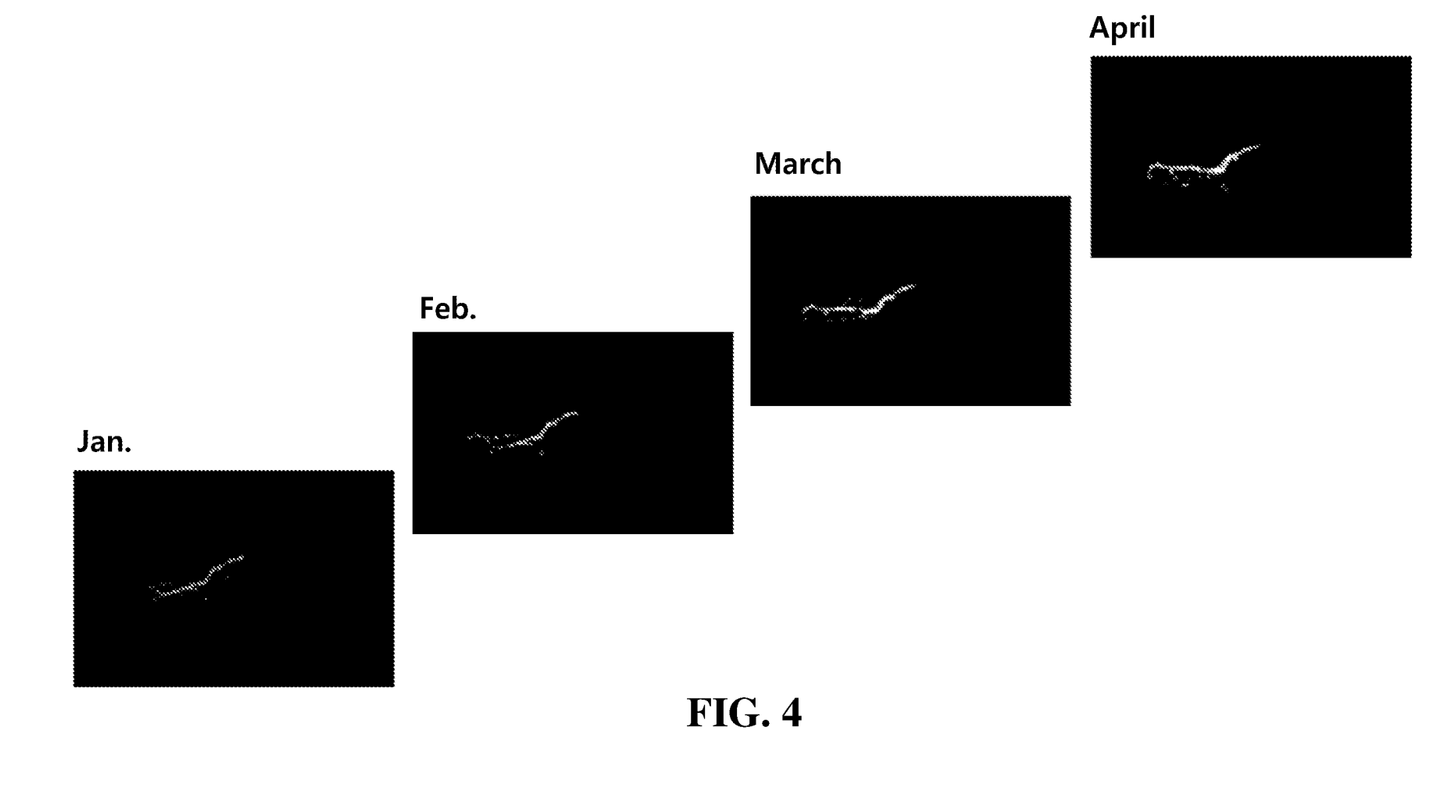
FIG. 4 is a view showing a change map acquired for a specific inspection target structure in the period from January to April according to an embodiment of the present invention.

FIG. 4 is a view showing a change map acquired for a specific inspection target structure in the period from January to April according to an embodiment of the present invention.

The change detection unit 230 may determine the risk of a structure through such a change map.

According to an embodiment, the change detection unit 230 may determine whether there is a risk based on the absolute size of an area in which a change is detected for a specific inspection target structure or the relative size of the area in which the change is detected relative to the total area of the structure. The calculation of the area may be performed as follows. First, the ratio between the distance between feature points obtained based on a taken image and the distance between the feature points in an actual structure may be calculated, and an actual area may be calculated by applying the ratio to a change region within the image.

Furthermore, according to another embodiment, an area in which a change is made per unit time is calculated based on a detected change pattern, and a risk may be detected as being present when a corresponding value is equal to or larger than a preset value. The area is calculated in the same manner as described above, and a risk detection signal may be generated for one of a plurality of levels.

For example, when a change area value per unit time is equal to or larger than a preset value and is smaller than a first value, a level 1 risk is detected as being present. Alternatively, when the change area value per unit time is equal to or larger than the first value and is smaller than a second value, a level 2 risk is detected as being present. Then a risk signal suitable for each step may be transmitted to the administrator terminal 300.

The change prediction unit 240 according to an embodiment serves to predict the change pattern of an inspection target structure in the future through a plurality of images acquired by the image acquisition unit 210 by using a deep learning algorithm.

According to an embodiment, the change prediction unit 240 predicts a change to a structure by using a Long Short-Term Memory (LSTM) algorithm.

An LSTM algorithm is a type of Recurrent Neural Network (RNN). An RNN is mainly used for temporally correlated data, and is an algorithm that predicts subsequent data (t+1) by taking into consideration the correlation between previous data (t−1) and current data (t).

An RNN has a problem in that it loses its gradient as it goes back in time. The reason for this is similar to the reason for using a nonlinear function other than a linear function as an activation function, and is that a problem arises in that a value becomes smaller as past data is continuously multiplied according to an initial value. The LSTM algorithm was developed to solve this problem, and is an algorithm that predicts future data by taking into consideration not only immediately previous data but also macroscopically past data in the process of generating a predicted value.

The table below is a table illustrating the principle of predicting a change to a structure at a later time point through the images X1 to X5 taken at time points t1 to t5, respectively.

TABLE 1

| X_train | Y_train |
|---|---|
| [X1, X2, . . . , X5] | [X6] |
| [X1, X2, . . . , X5] | [X7] |
| . . . | . . . |
| [X(t − 5), X(t − 4), . . . , X(t − 1)] | [Xt] |

Referring to the table above, through the first to fifth images (X1, X2, . . . , X5) acquired at times t1 to t5, the shape of a structure at time t6, i.e., a change pattern, is predicted, and a sixth image may be generated. In this case, the time intervals between time points t1 to t6 may be the same. Also, an image of the structure at time t7 may be generated based on the images of the structure at time points t2 to t6.

Figure 5:
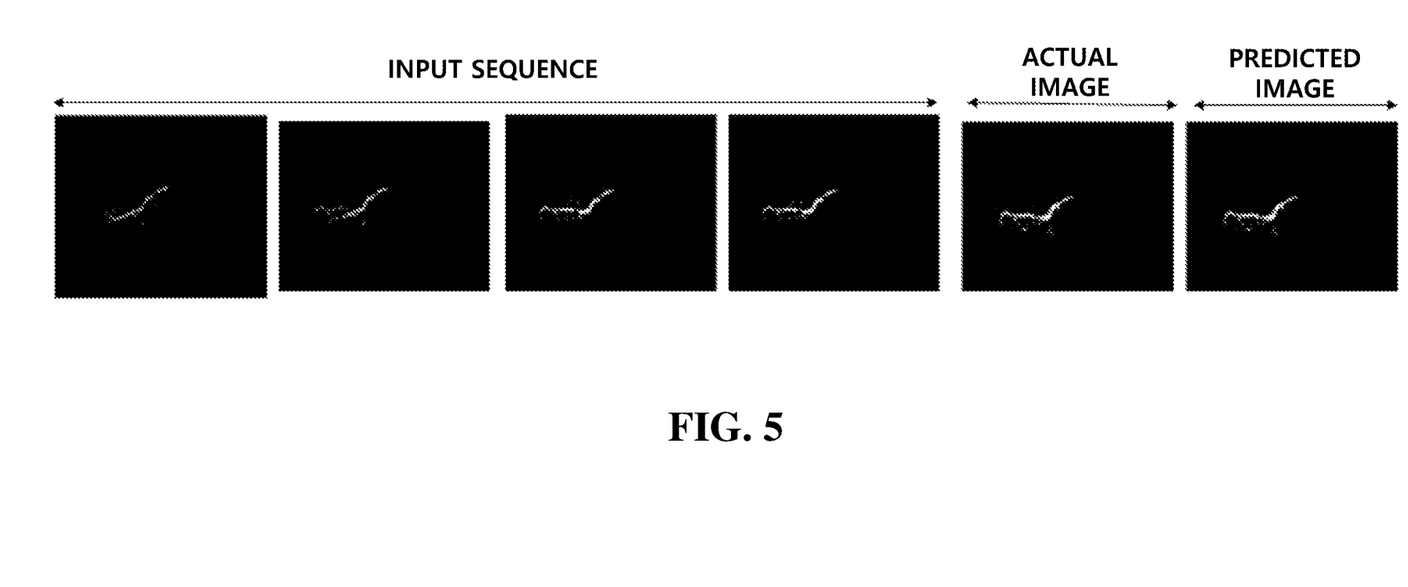
FIG. 5 is a view showing a result image generated by performing change prediction according to an embodiment of the present invention.

FIG. 5 is a view showing a result image generated by performing change prediction according to an embodiment of the present invention.

Referring to FIG. 5, it can be seen that when a plurality of images acquired at different time points is input, the image generated by predicting a change to a structure at a specific time point in the future based on the LSTM algorithm is the same as the image of the structure actually taken at the specific time point.

The change prediction unit 240 may determine whether there is a risk based on the absolute size of the damaged area of a structure at a specific time point as a result of the prediction or the relative size of the area in which a change is detected relative to the total area of the structure. Furthermore, the change prediction unit 240 may calculate the area in which a change is made per unit time based on a detected change pattern and may detect a risk as being present and transmit a corresponding signal or information to the administrator terminal 300 when a corresponding value is equal to or larger than a preset value, like the change detection unit 230.

According to an embodiment of the present invention, a change, such as damage, to an inspection target structure may be accurately detected in a convenient way using a drone.

Furthermore, via a machine learning algorithm, feature values are acquired from images taken at different time points and a change to a structure is detected through comparative analysis, so that accurate analysis related to damage to the structure may be achieved.

Meanwhile, the prediction of a risk and preparation for a risk may be made in advance by predicting a future change to a structure based on acquired images.

The foregoing description of the present invention is intended for illustration purposes. It will be understood by those of ordinary skill in the art to which the present invention pertains that each of the embodiments described above may be easily modified into other specific forms without changing the technical spirit or essential features of the present invention. Accordingly, it should be understood that the embodiments described above are illustrative but not restrictive in all respects. For example, each component described as being in a single form may be implemented in a distributed form, and, likewise, components described as being in a distributed form may also be implemented in an integrated form.

The scope of the present invention is defined by the attached claims, and all variations or modifications derived from the meanings and scope of the claims and their equivalents should be construed as falling within the scope of the present invention.

What is claimed is:

1. A method for an image analysis server to detect a change to a structure by using a drone, the method comprising:
receiving a first image of the structure taken at a first time and a second image of the structure taken at a second time by a drone;
acquiring a first feature map for the first image and a second feature map for the second image using a machine learning algorithm;
detecting a difference between a first feature of the first feature map and a second feature of the second feature map;
predicting a risk of the structure based on the detected difference using a recurrent neural network; and
measuring an area of an actual structure in which the change is detected based on the first feature map and the second feature map,
wherein detecting the difference comprises,
determining a relative size of the area of the structure in which the change is detected in the second feature map with a same angle view of the first feature map with respect to a total area of the structure in the first feature map, and determining a risk level of the structure by comparing the area of the structure where the change is detected with a preset value, wherein measuring the area of the actual structure comprises, calculating a ratio between a first distance between feature points in the second feature map of the structure and a second distance between feature points in the actual structure, and calculating the area of the actual structure by applying the ratio to a change region within the second feature map of the structure, wherein the recurrent neural network comprises a long short-term memory algorithm generating a new image capable of predicting the change of the structure over time.

2. The method of claim 1, wherein the second time comprises a plurality of time points, and the second image of the structure comprises a plurality of images taken corresponding to each of the plurality of the time points, wherein the new image is generated based on the plurality of images using the long short-term memory algorithm.

3. The method of claim 2, wherein an interval of time between the plurality of the time points is constant.

4. The method of claim 1, wherein the risk level comprises a first risk level defined when a change region value per unit time in the area of the structure is greater than or equal to a first preset value and less than a preset second value, and a second risk level defined when the change region value per unit time in the area of the structure is greater than or equal to the preset second value and less than a third preset value.

* * * * *